US009075164B2

(12) United States Patent
Reiderman

(10) Patent No.: US 9,075,164 B2
(45) Date of Patent: Jul. 7, 2015

(54) APPARATUS AND METHOD FOR DEEP TRANSIENT RESISTIVITY MEASUREMENT

(75) Inventor: Arcady Reiderman, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 578 days.

(21) Appl. No.: 13/461,870

(22) Filed: May 2, 2012

(65) Prior Publication Data

US 2013/0297214 A1  Nov. 7, 2013

(51) Int. Cl.
   G01V 3/38  (2006.01)
   G01V 3/12  (2006.01)
(52) U.S. Cl.
   CPC ... *G01V 3/38* (2013.01); *G01V 3/12* (2013.01)
(58) Field of Classification Search
   CPC ............. G01V 3/30; G01V 3/12; G01V 3/28; G01V 3/38; E21B 47/102
   USPC ........... 702/6, 7, 9, 11, 38, 85, 106, 115, 195; 324/338, 339, 343, 323
   See application file for complete search history.

(56) References Cited

U.S. PATENT DOCUMENTS

| 4,796,186 | A | 1/1989 | Kaufman |
| 4,882,542 | A | 11/1989 | Vail, III |
| 5,038,107 | A | 8/1991 | Gianzero et al. |
| 5,089,779 | A | 2/1992 | Rorden |
| 5,103,919 | A | 4/1992 | Warren et al. |
| 5,159,577 | A | 10/1992 | Twist |
| 5,259,468 | A | 11/1993 | Warren et al. |
| 5,452,761 | A | 9/1995 | Beard et al. |
| 5,883,515 | A | 3/1999 | Strack et al. |
| 6,218,842 | B1 * | 4/2001 | Bittar et al. .................. 324/339 |
| 6,541,975 | B2 | 4/2003 | Strack |

(Continued)

FOREIGN PATENT DOCUMENTS

| CN | 201232545 Y | 5/2009 |
| WO | 9749889 | 12/1997 |
| WO | 2012129058 A2 | 9/2012 |

OTHER PUBLICATIONS

Notification of Transmittal of the International Search Report and the Written Opinion of the International Searching Authority, or the Declaration; PCT/US2013/038213; Aug. 13, 2013, 9 pages.

(Continued)

*Primary Examiner* — John H Le
(74) *Attorney, Agent, or Firm* — Cantor Colburn LLP

(57) ABSTRACT

A method of processing data includes: disposing a downhole tool in a borehole in an earth formation, the downhole tool including a conductive carrier, a transmitter, a first receiver disposed at a first axial distance from the transmitter, and a second receiver disposed at a second axial distance from the transmitter that is less than the first axial distance; performing a downhole electromagnetic operation, the operation including transmitting an electromagnetic (EM) signal from the transmitter into the formation and detecting a first EM response signal by the first receiver and a second EM response signal by the second receiver; applying a linear transformation to the second EM response signal to generate a transformed signal, the linear transformation having parameters associated with a set of data corresponding to a signal representing the conductive carrier; and subtracting the transformed signal from the first EM response signal to generate a corrected EM signal.

20 Claims, 7 Drawing Sheets

(56) References Cited

U.S. PATENT DOCUMENTS

| | | |
|---|---|---|
| 6,891,376 B2 | 5/2005 | Hanstein et al. |
| 6,914,433 B2 | 7/2005 | Wright et al. |
| 6,998,844 B2 * | 2/2006 | Omeragic et al. ............ 324/343 |
| 7,027,922 B2 | 4/2006 | Bespalov et al. |
| 7,046,009 B2 | 5/2006 | Itskovich |
| 7,066,280 B2 | 6/2006 | Sullivan et al. |
| 7,150,316 B2 | 12/2006 | Itskovich |
| 7,167,006 B2 | 1/2007 | Itskovich |
| 7,257,489 B2 | 8/2007 | Hsu et al. |
| 7,366,616 B2 | 4/2008 | Bennett et al. |
| 7,502,690 B2 | 3/2009 | Thomsen et al. |
| 7,541,813 B2 | 6/2009 | Synder, Jr. et al. |
| 7,583,085 B2 | 9/2009 | Hall et al. |
| 7,654,340 B2 | 2/2010 | Self et al. |
| 7,659,723 B2 | 2/2010 | Meyer et al. |
| 8,239,172 B2 | 8/2012 | Reiderman et al. |
| 2004/0098201 A1 | 5/2004 | Tabarovsky |
| 2005/0024060 A1 | 2/2005 | Bittar |
| 2005/0092487 A1 | 5/2005 | Banning et al. |
| 2006/0061364 A1 | 3/2006 | Banning et al. |
| 2006/0186887 A1 | 8/2006 | Strack |
| 2007/0108981 A1 | 5/2007 | Banning-Geertsma et al. |
| 2007/0168133 A1 | 7/2007 | Bennett et al. |
| 2007/0216416 A1 | 9/2007 | Itskovich |
| 2007/0256832 A1 | 11/2007 | Hagiwara et al. |
| 2008/0258733 A1 | 10/2008 | Bittar |
| 2009/0216454 A1 | 8/2009 | Ziolkowski et al. |
| 2009/0237084 A1 | 9/2009 | Itskovich et al. |
| 2009/0243618 A1 | 10/2009 | Wang et al. |
| 2010/0097065 A1 | 4/2010 | Itskovich et al. |
| 2010/0100329 A1 | 4/2010 | Ekseth et al. |
| 2010/0109672 A1 | 5/2010 | Rabinovich et al. |
| 2010/0109905 A1 | 5/2010 | Itskovich |
| 2010/0125439 A1 | 5/2010 | Reiderman et al. |
| 2010/0305864 A1 | 12/2010 | Gies |
| 2011/0012602 A1 | 1/2011 | Reiderman et al. |
| 2011/0257886 A1 | 10/2011 | Itskovich et al. |
| 2012/0105076 A1 | 5/2012 | Li et al. |
| 2012/0247833 A1 | 10/2012 | Ekseth et al. |

OTHER PUBLICATIONS

Notification of Transmittal of the International Search Report and the Written Opinion of the International Searching Authority, or the Declaration; PCT/US2013/074240; Mailed Mar. 13, 2014, 14 pages.

Liu, Electromagnetic Logging Technique Based on Borehole Radar, Sep. 2002, vol. 40, No. 9. IEEE Transactions on Geoscience and Remote Sensing. pp. 2083-2092.

Draper et al. "Applied Regression Analysis", Chapter 10, An Introduction to Nonlinear Estimation, 1981 John Wiley & sons, 2nd Edition, pp. 458-464.

* cited by examiner

APPARATUS AND METHOD FOR DEEP TRANSIENT RESISTIVITY MEASUREMENT

BACKGROUND

Geologic formations below the surface of the earth may contain reservoirs of oil and gas, which are retrieved by drilling one or more boreholes into the subsurface of the earth. The boreholes are also used to measure various properties of the boreholes and the surrounding subsurface formations.

Deep transient logging while drilling (LWD), especially "look-ahead" capability, has been shown to have a great potential in formation evaluation and measurement, such as in predicting over-pressed zones, detecting faults in front of a drill bit in horizontal wells and profiling salt structures. These applications typically require depth of investigation (DOI) ranges of about 5-50 meters. One challenge that occurs during deep transient LWD operations is the generation of a parasitic signal due to conductive drill collars or other downhole components.

A variety of techniques have been proposed to reduce this signal in acquired data. Exemplary techniques include using ferrite and copper shielding, using reference signal for calibration purposes and using asymptotic behavior of the conductive collar time response to filter out the collar signal.

In the case of the target DOI being up to 50 meters, the conductive collar signal is typically more than two orders of magnitude greater than the formation signal even if ferrite and copper shields are used. Then the accuracy of bucking and filtering may not be sufficient to facilitate measurements.

SUMMARY

A method of processing electromagnetic signal data includes: disposing a downhole tool in a borehole in an earth formation, the downhole tool including a conductive carrier, a transmitter, a first receiver disposed at a first axial distance from the transmitter, and a second receiver disposed at a second axial distance from the transmitter that is less than the first axial distance; performing a downhole electromagnetic operation, the operation including transmitting an electromagnetic (EM) signal from the transmitter into the formation and detecting a first EM response signal by the first receiver and a second EM response signal by the second receiver; applying a linear transformation to the second EM response signal to generate a transformed signal, the linear transformation having parameters associated with a set of data corresponding to a signal representing the conductive carrier; and subtracting the transformed signal from the first EM response signal to generate a corrected EM signal.

An apparatus for processing electromagnetic signal data includes: a downhole tool configured to be disposed in a borehole in an earth formation, the downhole tool including a conductive carrier, a transmitter, a first receiver disposed at a first axial distance from the transmitter, and a second receiver disposed at a second axial distance from the transmitter that is less than the first axial distance; and a processor configured to perform: receiving a first electromagnetic (EM) response signal from the first receiver and a second EM response signal from the second receiver in response to an EM signal transmitted into the formation from the transmitter; applying a linear transformation to the second EM response signal to generate a transformed signal, the linear transformation having parameters associated with a set of data corresponding to a signal representing the conductive carrier; and subtracting the transformed signal from the first EM response signal to generate a corrected EM signal.

BRIEF DESCRIPTION OF THE DRAWINGS

The following descriptions should not be considered limiting in any way. With reference to the accompanying drawings, like elements are numbered alike.

DETAILED DESCRIPTION

Apparatuses and methods are provided for reducing and/or eliminating parasitic signal data due to downhole components (e.g., conductive drill collars, borehole strings or tool components) from electromagnetic (EM) measurement data. In one embodiment, the apparatuses and methods described herein are utilized with transient EM operations, such as ultra-deep resistivity measurement while drilling. An exemplary method is based on acquiring EM signals from at least a first and second EM receiver that are axially spaced downhole relative to an EM transmitter. In one embodiment, a first EM signal is generated from the first receiver and a second EM signal is generated from the second receiver located closer to the transmitter. The second receiver is combined with a coefficient or function to generate a transformed signal, which can be subtracted from the first EM signal to generate a corrected EM signal that is free (or at least substantially free) of the parasitic signal.

In one embodiment, a linear transformation of the second signal is performed with parameters that are adjusted based on acquiring a set of data representing at least substantially only the drill collar signal. For example, the linear transformation is a convolution of the second EM signal with an impulse response function having two parameters. The transformed signal is subtracted from the first signal to generate an EM signal that has at least substantially all of the influence from the conductive component removed, without requiring data extrapolation.

Figure 1:
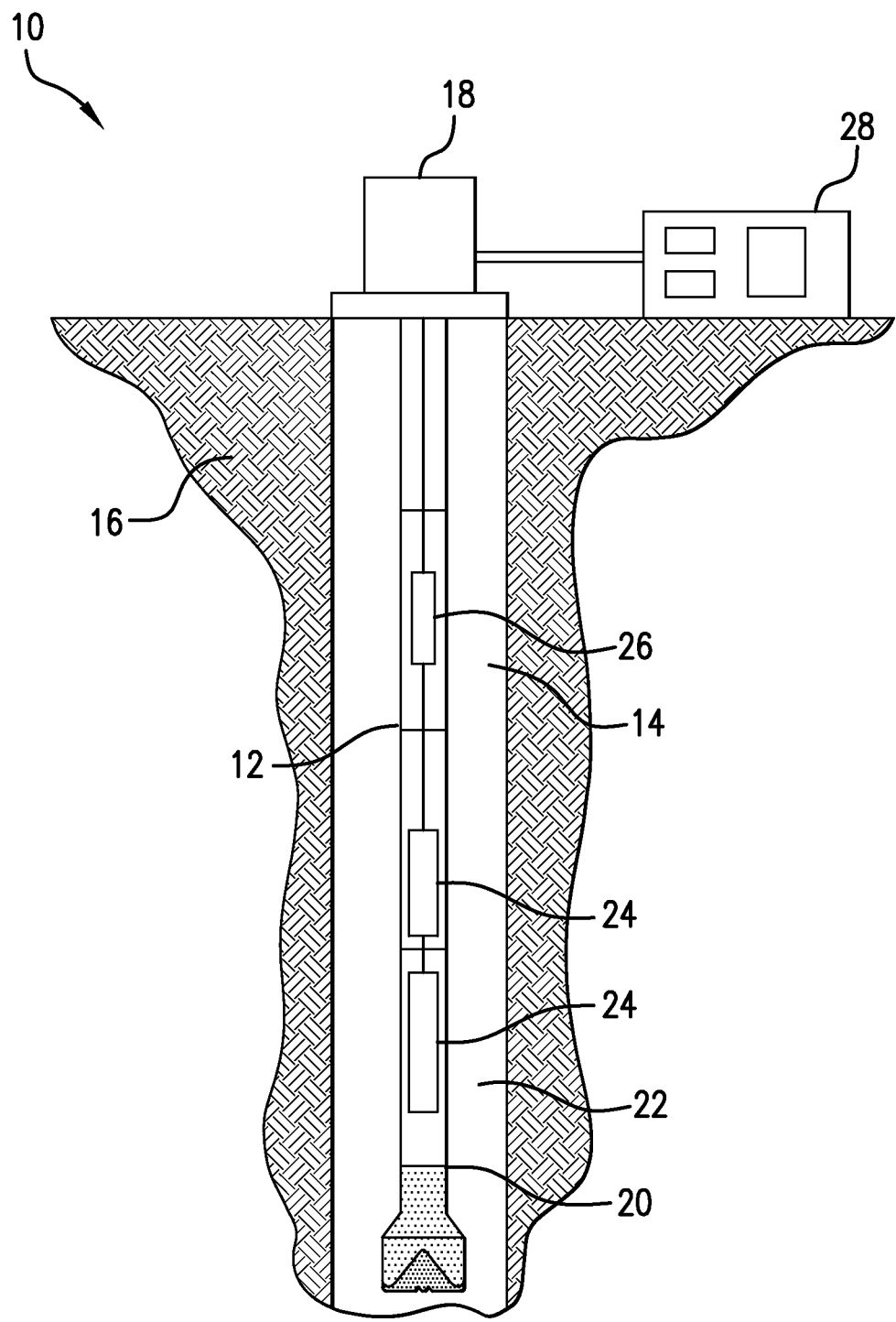
FIG. 1 depicts an exemplary embodiment of a drilling, formation evaluation and/or production system.

Referring to FIG. 1, an exemplary embodiment of a well drilling, logging and/or production system 10 includes a borehole string 12 that is shown disposed in a wellbore or borehole 14 that penetrates at least one earth formation 16 during a drilling or other downhole operation. As described herein, "borehole" or "wellbore" refers to a single hole that makes up all or part of a drilled well. As described herein, "formations"

refer to the various features and materials that may be encountered in a subsurface environment and surround the borehole.

A surface structure 18 includes various components such as a wellhead, derrick and/or rotary table or supporting the borehole string, lowering string sections or other downhole components. In one embodiment, the borehole string 12 is a drillstring including one or more drill pipe sections that extend downward into the borehole 14, and is connected to a drilling assembly 20. In one embodiment, system 10 includes any number of downhole tools 24 for various processes including formation drilling, geosteering, and formation evaluation (FE) for measuring versus depth and/or time one or more physical quantities in or around a borehole. The tool 24 may be included in or embodied as a bottomhole assembly (BHA) 22, drillstring component or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carrier examples include casing pipes, wirelines, wireline sondes, slickline sondes, drop shots, downhole subs, bottom-hole assemblies, and drill strings.

The tool 24, the BHA 22 or other portions of the borehole string 12 includes sensor devices configured to measure various parameters of the formation and/or borehole. In one embodiment, the sensor devices include one or more transmitters and receivers configured to transmit and receive electromagnetic signals for measurement of formation properties such as composition, resistivity and permeability. An exemplary measurement technique is a transient EM technique.

In one embodiment, the tool 24, BHA 22 and/or sensor devices include and/or are configured to communicate with a processor to receive, measure and/or estimate directional and other characteristics of the downhole components, borehole and/or the formation. For example, the tool 24 is equipped with transmission equipment to communicate with a processor such as a downhole processor 26 or a surface processing unit 28. Such transmission equipment may take any desired form, and different transmission media and connections may be used. Examples of connections include wired, fiber optic, acoustic, wireless connections and mud pulse telemetry.

The processor may be configured to receive data from the tool 24 and/or process the data to generate formation parameter information. In one embodiment, the surface processing unit 28 is configured as a surface drilling control unit which controls various drilling parameters such as rotary speed, weight-on-bit, drilling fluid flow parameters and others.

In one embodiment, the tool 24 is configured as a downhole logging tool. As described herein, "logging" refers to the taking of formation property measurements. Examples of logging processes include measurement-while-drilling (MWD) and logging-while-drilling (LWD) processes, during which measurements of properties of the formations and/or the borehole are taken downhole during or shortly after drilling. The data retrieved during these processes may be transmitted to the surface, and may also be stored with the downhole tool for later retrieval. Other examples include logging measurements after drilling, wireline logging, and drop shot logging.

Figure 2:
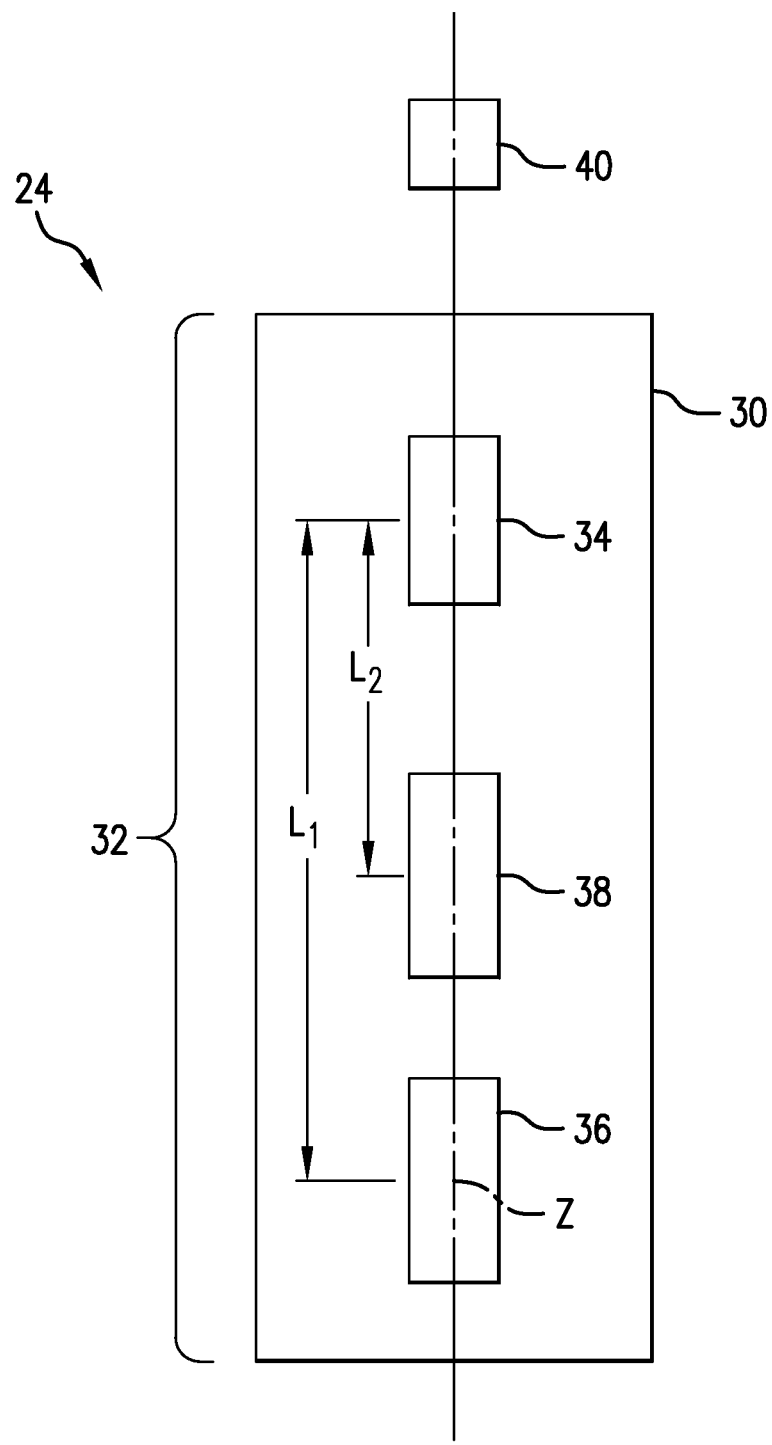
FIG. 2 depicts an exemplary embodiment of a downhole tool.

FIG. 2 illustrates an embodiment of the downhole tool 24. The downhole tool 24 is disposed in a carrier such as a housing 30. The housing is incorporated as or in a downhole component such as a borehole string section, a drill pipe or a drill collar. The housing 30 and/or other component are typically made from a conducting material such as steel. The tool 24 includes a resistivity measurement assembly 32 incorporating at least one electromagnetic (EM) source and multiple EM receivers. An EM transmitter 34 (e.g., a transmitter antenna or coil) is configured to emit an electric or magnetic field into the formation 16 and induce a magnetic field response that is measured by one or more EM receivers 36 and 38 (e.g., receiver coils). An electric source 40, which may be disposed downhole or at a surface location, is configured to apply electric current to the transmitter 34.

In one embodiment, the measurement assembly 32 is configured to perform an inductive transient EM measurement operation. The source 40 applies transient pulses of current to the transmitter 34, which induces current in the formation 16. The current generates a magnetic field that is detected by the receivers 36 and 38.

The tool 24 utilizes electromagnetic measurements to determine the electrical conductivity of formations surrounding the borehole. Various types of tools may be employed to measure formations at various "depths of investigations" or DOI, which correspond to distances from the tool and/or borehole in a direction perpendicular to an axis of the tool and/or borehole (e.g., the Z axis of FIG. 2), referred to herein as "radial distances." Transient EM methods are particularly useful for ultra-deep investigations (e.g., radial distances of 10s to hundreds of meters from the tool and/or borehole). Typically, voltage or current pulses that are excited in a transmitter initiate the propagation of an electromagnetic signal in the earth formation. Electric currents diffuse outwards from the transmitter into the surrounding formation. At different times, information arrives at the measurement sensor from different investigation depths. Particularly, at a sufficiently late time, the transient electromagnetic field is sensitive only to remote formation zones and does not depend on the resistivity distribution in the vicinity of the transmitter.

In one embodiment, the transmitter and the receivers are disposed axially relative to one another. An "axial" location refers to a location along the Z axis that extends along a length of the tool 24 and/or borehole 14. The first receiver 36 is positioned at a selected axial distance L1 from the transmitter 34, and the second receiver 38 is positioned at a shorter axial distance L2 from the transmitter. For example, the first and second distances are selected to have a specific ratio, e.g., L1 is twice that of L2.

In one embodiment, the receivers 36 and 38 are identical or at least substantially identical, such that they would measure the same signal if the receivers are disposed at the same axial and radial location. For example, the receivers 36 and 38 each have the same (or at least substantially the same) configuration parameters. Such parameters include the number and diameter of coil windings, the coil material, the effective area, the magnetic field to voltage conversion factor and/or voltage gain.

Figure 3:
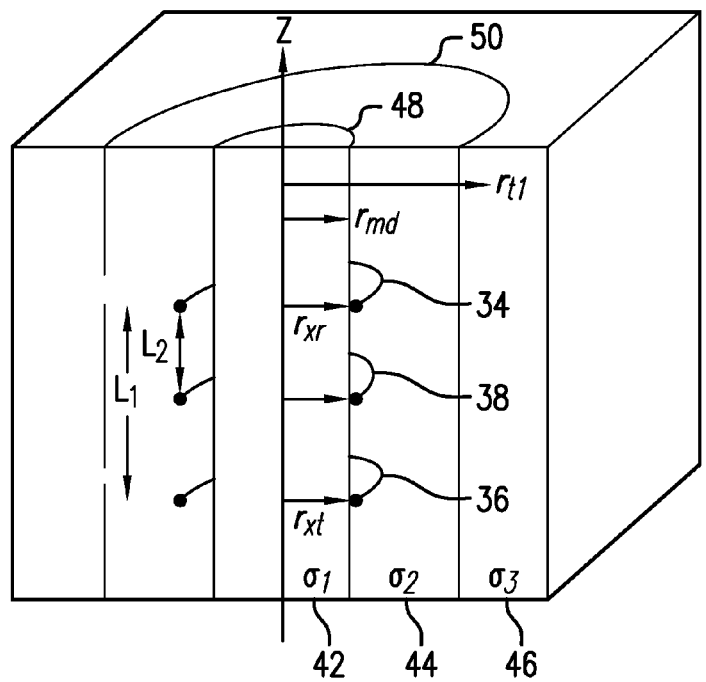
FIG. 3 depicts a structure representing an exemplary configuration of the downhole tool of FIG. 2 in an earth formation.

FIG. 3 shows an exemplary structure representing a configuration of the tool 24 with the formation 16. The structure includes a first zone 42 substantially defined by a metal drill collar, pipe or other conductive carrier with conductivity $\sigma_1$, a transition layer 44 having a conductivity $\sigma_2$, and a remote formation layer 46 having a conductivity $\sigma_3$. The magnetic permeability of the entire space is $\mu$. As illustrated, the boundary 48 separating the metal carrier from the transition layer and the boundary 50 separating the regions of transition layer and remote formation share a common Z-axis. As measured from the Z-axis, the radius of boundary 48 is labeled as $r_{md}$, and the radius of boundary 50 is labeled as $r_{tl}$. An electromagnetic field is excited by the transmitter current loop 34 of radius, $r_{xt}$, and is measured by receivers 36 and 38 of radius $r_{xr}$.

Figure 4:
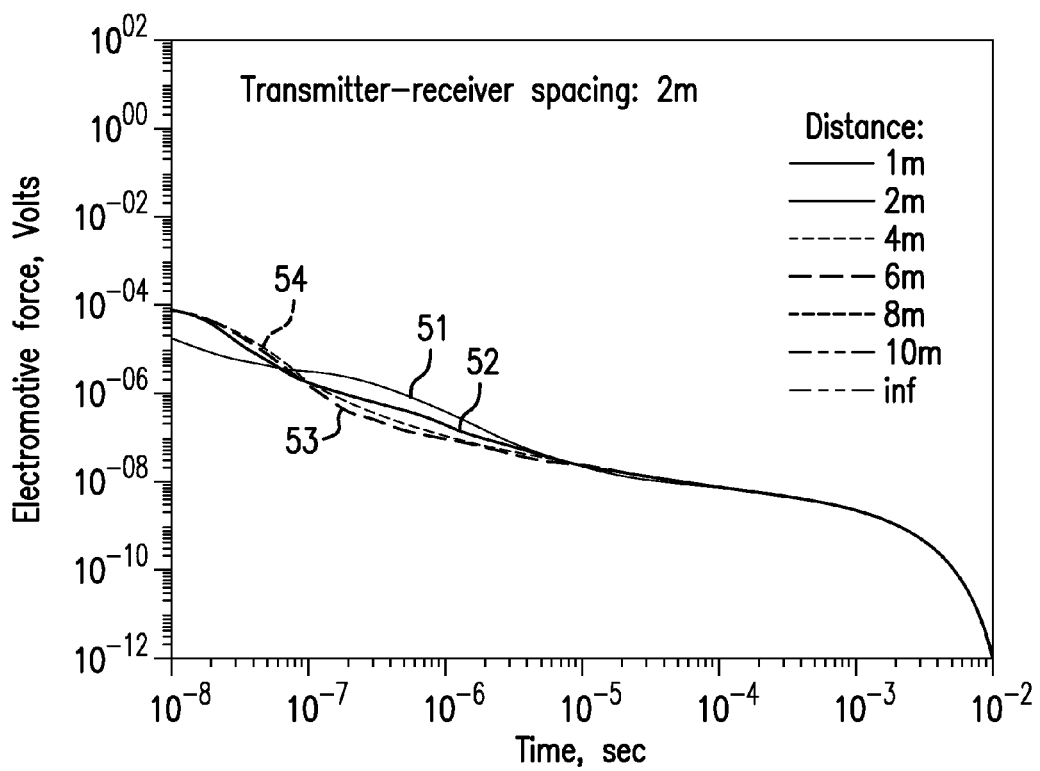
FIG. 4 depicts exemplary transient electromagnetic responses obtained in the presence of a typical conductive pipe.

FIG. 4 shows exemplary transient responses obtained in the presence of a typical conductive pipe. The conductivity is $\sigma=1.4*10^6$ S/m. Curves 51, 52 and 53 indicate responses at radial distances (perpendicular to the Z axis) of 1, 2, and 4 meters respectively to a remote boundary (e.g., boundary 204). Response curve 54 represents the response to a remote boundary at an infinite distance. Response curve 54 is nearly indistinguishable from and overlaps response curves at a distance of 6, 8 and 10 meters. FIG. 4 illustrates the fact that at late times corresponding to deep investigation, the conductive pipe signal typically dominates the transient response of the earth's formations by at least an order of magnitude. Even when using other methods to remove the main part of the conductive pipe signal (e.g., modeling results for the pipe signal in air, lab measurements of the pipe signal, by using bucking coil), there remains a part of the pipe signal left due to instability of the pipe signal caused by the drilling environment. The causes of the instability can be temperature dependence of electric conductivity of the pipe, changing effective distance between the transmitter and the receiver due to bending of the drill pipe, changing effective cross-sectional area of the receiver and transmitter and others. The instability of pipe signal may produce low frequency noise comparable or exceeding the formation signal especially at late times.

Figure 5:
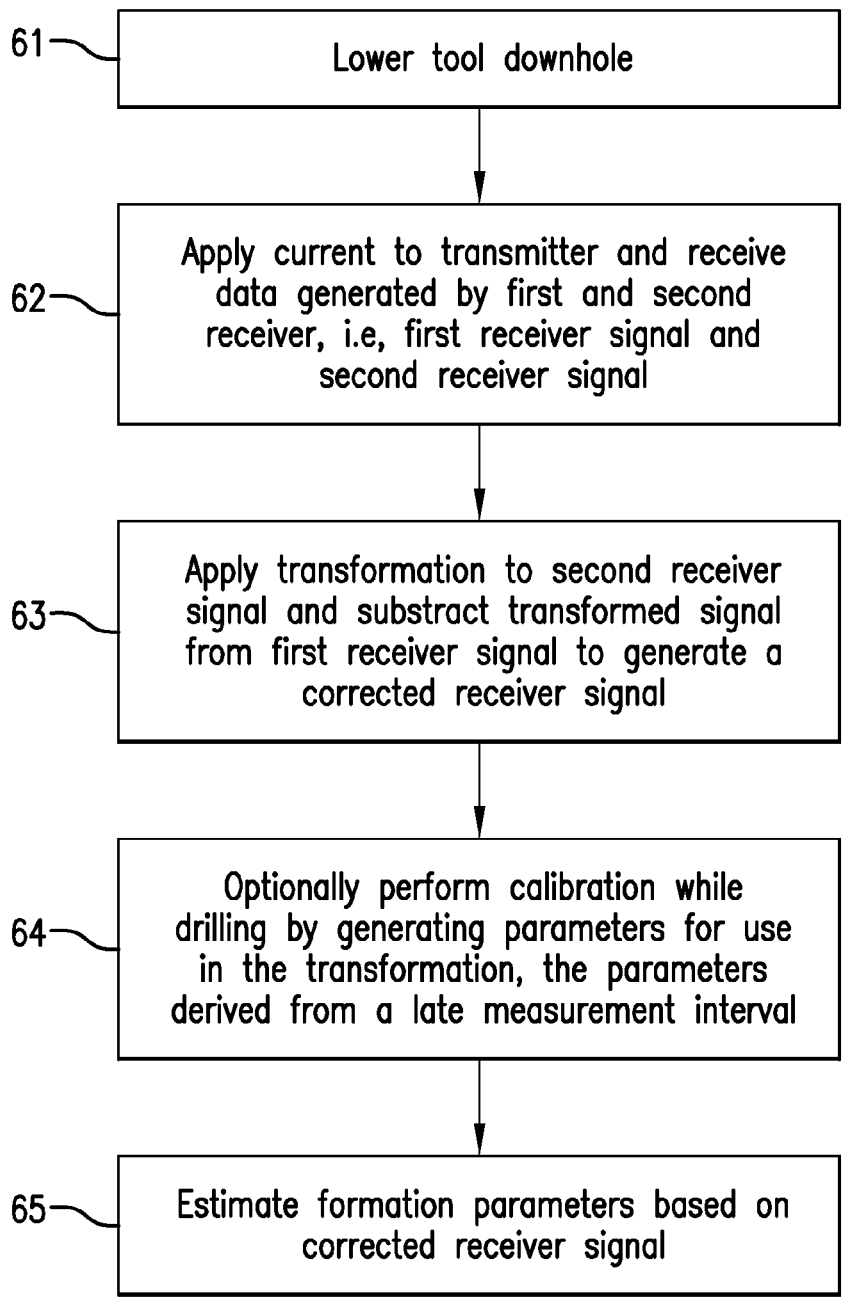
FIG. 5 is a flow chart providing an exemplary method of processing electromagnetic signal data and/or measuring formation properties.

FIG. 5 illustrates a method 60 for measuring parameters of an earth formation using electromagnetic signal measurements. The method also includes processing and/or analyzing received signals to reduce and/or eliminate the signal corresponding to conductive downhole components such as drill collars or drill pipes from EM data, such as transient EM data. The method 60 includes one or more of stages 61-65 described herein. The method may be performed continuously or intermittently as desired. The method is described herein in conjunction with the tool 24, although the method may be performed in conjunction with any number and configuration of processors, sensors and tools. The method may be performed by one or more processors or other devices capable of receiving and processing measurement data. In one embodiment, the method includes the execution of all of stages 61-65 in the order described. However, certain stages 61-65 may be omitted, stages may be added, or the order of the stages changed.

In the first stage 61, the tool 24 is lowered in the borehole. The tool 24 may be lowered, for example, during a drilling operation, LWD operation or via a wireline.

In the second stage 62, current is applied to the transmitter 34 and the receivers 36 and 38 receive signals from the formation during a selected time interval. An electric current is applied to the transmitter 34, which transmits a step-like waveform of a first magnetic field from the transmitter 34 to induce an electric current in the formation which generates an associated second magnetic field that is measured by the receivers 36 and 38, which generate a first receiver signal (R1) and a second receiver signal (R2) respectively. It is noted that each receiver signal can encompass one or multiple signals over one or more time intervals.

In one embodiment, receiver signal data is acquired over a time that exceeds a time period of interest for formation signals. This includes a time interval from $t_1$ (the first time of interest for the formation signal) to $t_4$ (the end of time interval over which the drill pipe signal is dominant). A first time interval $\{t_1,t_2\}$ includes a signal that is responsive to both the formation property and to a drill pipe or other conductive component, and a second time interval $\{t_3,t_4\}$ includes a signal that is dominated by or responsive almost entirely to the drill pipe. The second time interval can be determine by, e.g., calibration data taken at the surface, prior measurement data or known intervals.

In the third stage 63, a transformation is applied to the second receiver signal R2 to generate a transformed signal. The transformed signal is then subtracted from the first receiver signal R1 to generate a corrected signal that is entirely or at least substantially entirely free of the portion of the first signal due to the conductive drill pipe or other downhole component.

In one embodiment, the second receiver signal R2 is transformed by multiplying the receiver signal R2 by some coefficient. The coefficient may be a constant based on, e.g., a ratio between the distance from R1 to the transmitter (T) and the distance from R2 to the transmitter T. An exemplary ratio is $(R1-T)^3/(R1-R2)^3$, where R1–T is the distance from R1 to T and R1–R2 is the distance from R1 to R2.

In one embodiment, the transformation is a linear transformation having parameters that are adjusted based on acquiring a set of data at a late time interval $\{t_3,t_4\}$ during which the received signal contains at least substantially no portion, or at least less than a tolerable systematic error, of the formation signal, therefore representing the drill collar signal only. This late time interval can be ascertained by experimentation, previous measurement data or other knowledge indicating at what time the collar signal dominates the receiver signal.

In one embodiment, the linear transformation is a convolution with an impulse response function having two or more parameters. An exemplary impulse response function is a function having parameters that include the second signal (R2) and a time value (or multiple time values corresponding to sampling points) during a selected time interval. In one embodiment, the parameters are taken from the second receiver data taken at the late time interval $\{t_3,t_4\}$.

Figure 6:
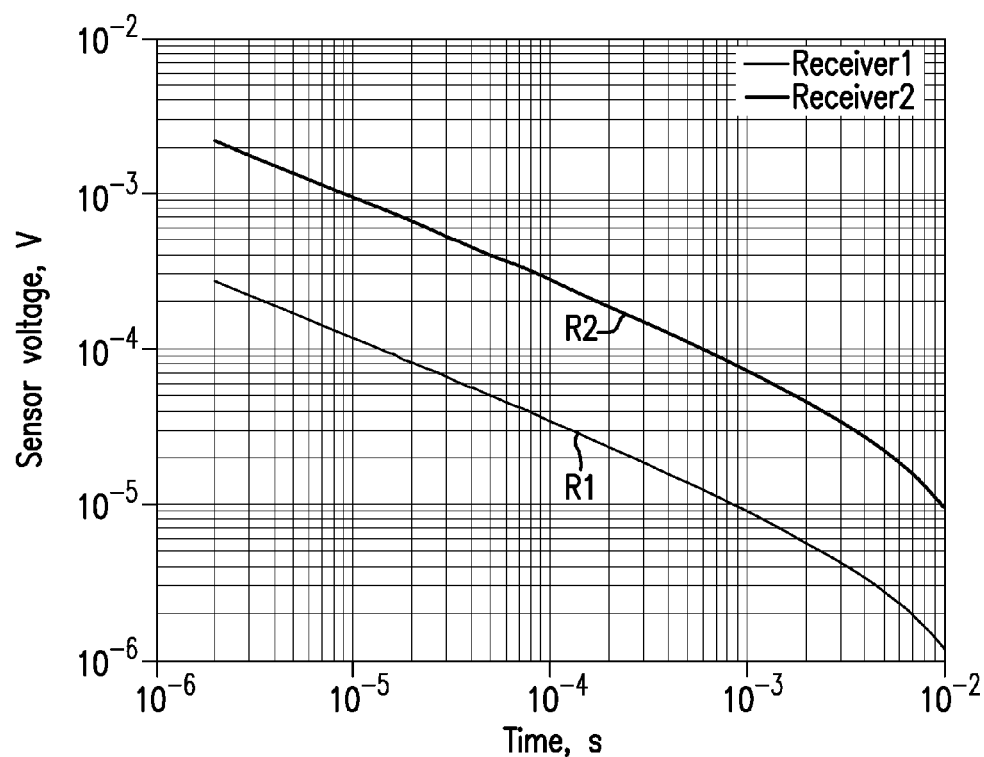
FIG. 6 depicts a model including time-domain signals from a first and second receiver placed on a conductive drill collar with no surrounding conductive media.

FIG. 6 shows a model including time-domain signals R1 and R2 from two receivers 36 and 38 placed on a conductive drill collar with no conductive media surrounding the tool 24. The modeling represented in FIG. 6 was created for two receivers having a Z-axis direction of sensitivity. The receivers are spaced at different locations on the Z axis relative to the transmitter; R1 corresponds to receiver 36 spaced 10 m from the transmitter 34, and R2 corresponds to receiver 38 spaced 5 m from the transmitter. The transmitter magnetic dipole moment was 50 Am$^2$ and the effective area of the receivers were 10 m$^2$. The model results represent an initial calibration condition where the two receivers are used to zero out the signal from the drill collar. The model is provided to illustrate a derivation of the impulse response function and demonstrate how the convolution isolates the signal from the drill collar or other conductive component.

An impulse response h(t) in the time domain is defined as:

$$R_1(t) = \int_0^t h(t-\tau) \cdot R_2(\tau) d\tau, \qquad (1)$$

where the first receiver response $R_1(t)$ in this model is defined as a convolution of the impulse response h(t) and the second receiver response $R_2(t)$. "τ" corresponds to some time delay. The corresponding equation in the frequency domain (s-domain) is:

$$R_1(s)=H(s) \cdot R_2(s), \qquad (2)$$

where H (s) is the Laplace transform of the impulse response h(t).

Signals in both receivers can be presented as $$R_1(s) = K_1(s) \cdot T(s), \text{ and} \quad (3)$$

$$R_2(s) = K_2(s) \cdot T(s), \quad (4)$$

where T (s) is the s-domain transmitter signal (magnetic field), and $K_1(s)$ and $K_2(s)$ are the transmitter-receiver transfer functions.

Then the Laplace transform of h(t) can be represented as:

$$H(s) = \frac{R_1(s)}{R_2(s)} \quad (5)$$

and correspondingly h(t) does not depend on the transmitter spectrum and is therefore immune to transmitter noise and instability.

In one embodiment, the impulse response is approximated by a function h*(t) with a limited number of parameters that are relatively easy to control. An example of this function is:

$$h^*(t) = x_1 \delta(t) + x_2 \cdot \frac{1}{t^{1/2}}, \quad (6)$$

where $X=(x_1; x_2)$ is the vector of parameters $x_1$ and $x_2$, and $\delta(t)$ is the Dirac delta-function.

During a measurement process such as a calibration with no formation signal, the parameters vector is determined from the following system of equations:

$$A \cdot X = B, \quad (7)$$

where $$A = \begin{Vmatrix} a_{11} & a_{21} \\ a_{12} & a_{22} \\ \ldots & \ldots \\ a_{1i} & a_{2i} \end{Vmatrix}$$

with $a_{1i} = R_2(t_i)$ and $$a_{2i} = \int_0^{t_i} \frac{R(\tau)}{(t_i - \tau)^{1/2}} \cdot d\tau.$$

$t_i$ represents the sampling times for the time-domain signals, i.e., $t_1, t_2, t_3 \ldots$.

B is represented by:

$$B = \begin{Vmatrix} b_1 \\ b_2 \\ \ldots \\ b_i \end{Vmatrix}, \quad (8)$$

with $b_{1i} = R_1(t_i)$.

Figure 7:
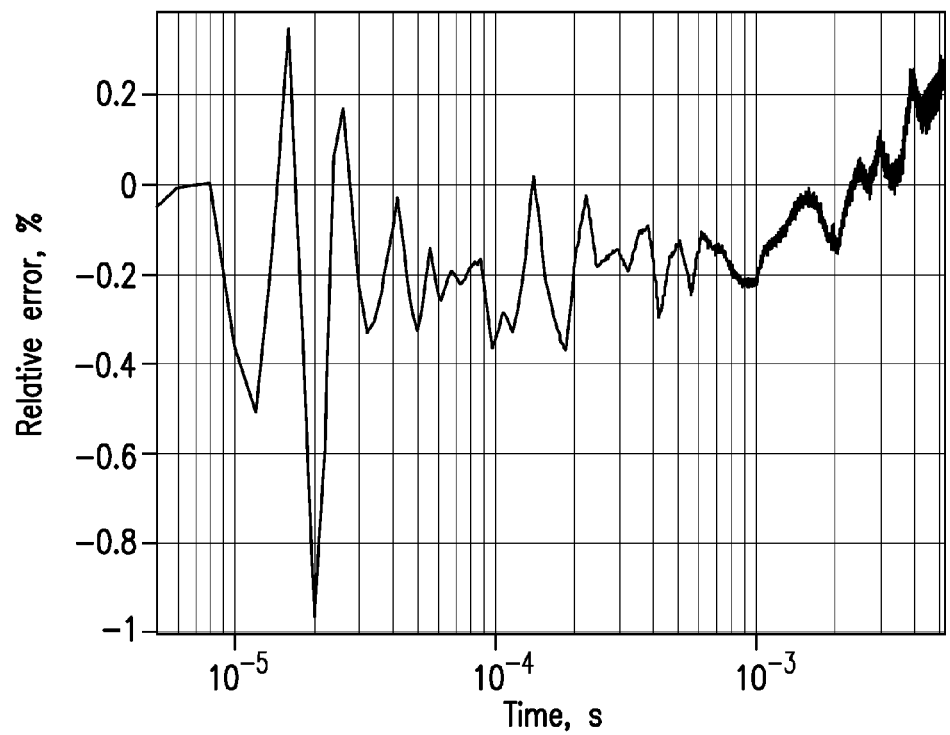
FIG. 7 depicts residuals of a drill collar signal after signal elimination from a first receiver signal of FIG. 6 using an impulse response function.

FIG. 7 shows residuals of the drill collar signal after signal elimination using impulse response (6), demonstrating that convolution of the impulse response and the second signal R2 yields a transformed signal that represents substantially all of the drill collar portion of the first receiver signal R1. The relative error shown in FIG. 7 is defined as:

$$\varepsilon(t) = 1 - \frac{1}{R_1(t)} \int_0^t h^*(t-\tau) \cdot R_2(\tau) d\tau. \quad (9)$$

Using the impulse response function described above, the linear combination of the receiver signals, i.e., subtraction of the transformed signal, provides a corrected signal S(t) that is at least substantially free of the drill collar signal. The corrected signal can be represented by:

$$S(t) = R_1(t) - \int_0^t h(t-\tau) \cdot R_2(\tau) d\tau \quad (10)$$

or $$S(t) = R_1(t) - \int_0^t h^*(t-\tau) \cdot R_2(\tau) d\tau.$$

In one embodiment, the corrected signal is not only at least substantially free from the drill collar signal, but also compensates for various downhole conditions. Exemplary conditions include temperature effects on of the transmitter dipole and waveform and the effective area of the receiver coils, transmitter instability, receiver electronics temperature drift and other instabilities associated with the downhole environment.

Referring again to FIG. 5, in an optional fourth stage 54, a calibration while drilling is performed. This can be done by utilizing measurements in an auxiliary late time acquisition interval where the formation signal can be neglected compared to the conductive drill collar signal, e.g., the late time interval $\{t_3, t_4\}$. Data in this interval is used to adjust parameters of the linear transformation, e.g., the parameters $x_1$ and $x_2$ of the impulse response function h*(t).

In the fifth stage 55, properties of the formation, such as electrical conductivity of the formation, are estimated based on the processed and corrected receiver signal R1.

Figure 8:
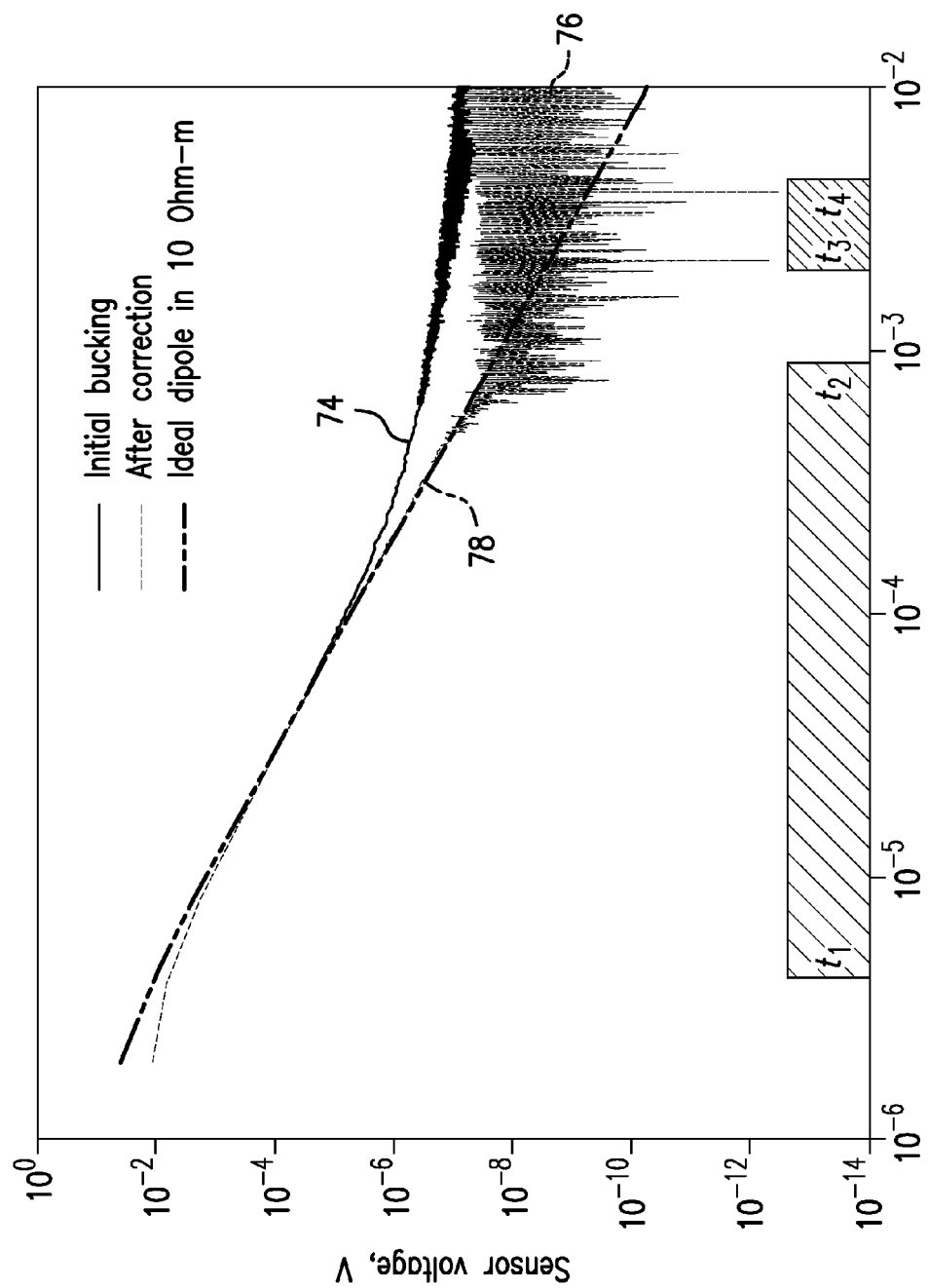
FIG. 8 depicts corrected electromagnetic signal data.
Figure 9:
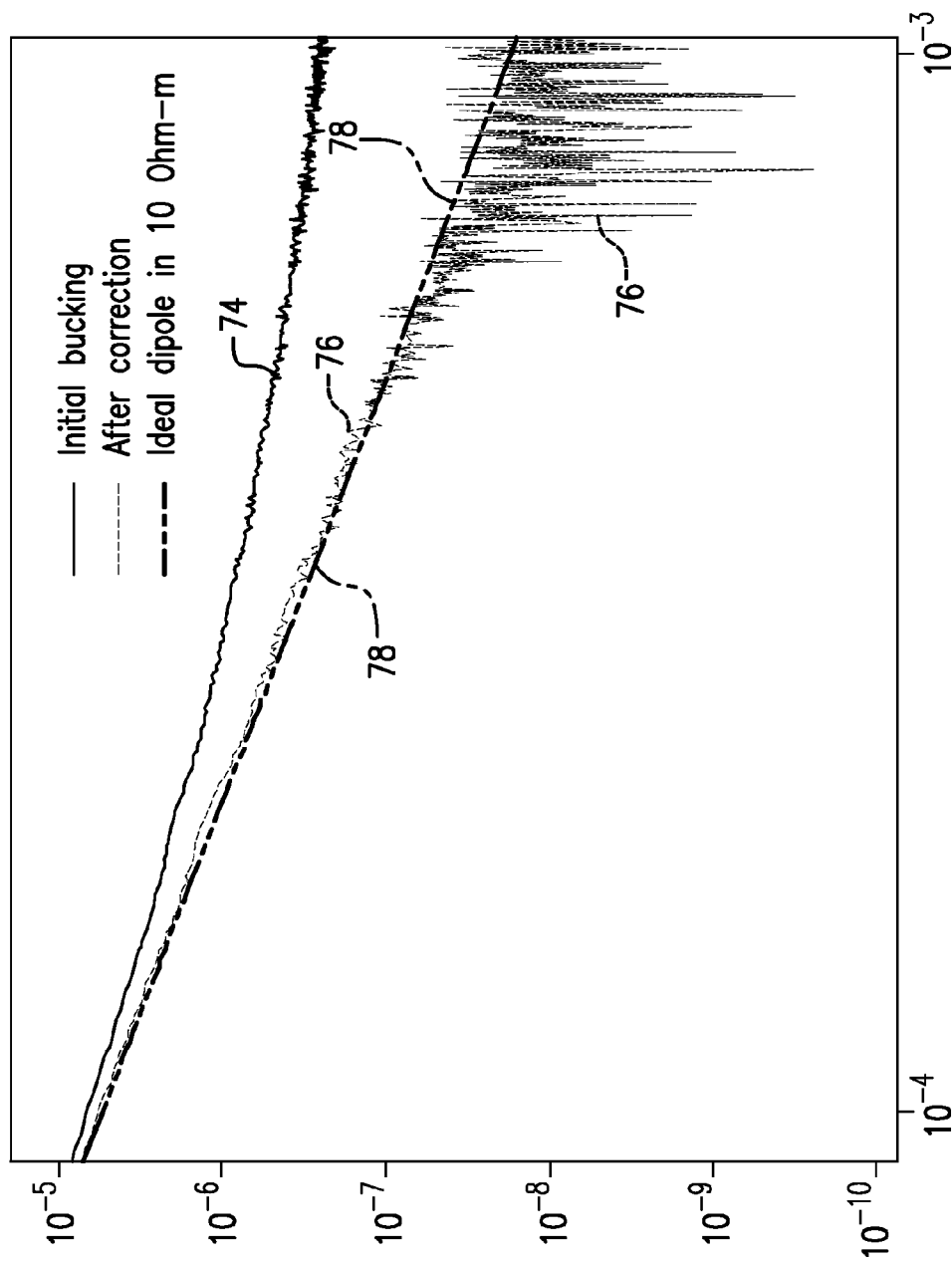
FIG. 9 depicts the signal data of FIG. 8 over a time interval of interest.

FIGS. 8-9 illustrate an example of the benefit of using transformation parameters based on data acquired downhole relative to data acquired during an uphole calibration. FIGS. 8-9 show corrected data as affected by bucking instability that causes 2% of a residual drill collar signal in a corrected signal S(t). FIGS. 8-9 include synthetic data obtained for the tool configuration shown in FIG. 3. The formation signal used for the model corresponds to a homogeneous resistivity of 10 Ohm·m. Data line 74 corresponds to the signal S(t) calculated according to equation (10) using parameters of the impulse response determined during uphole calibration. Data line 76 represents the signal S(t) calculated according to equation (10) using parameters of the impulse response determined while drilling by solving equation A·X=B, where:

$$a_{1i} = R_2(t_i); \quad (11)$$

$$a_{2i} = \int_0^{t_i} \frac{R(\tau)}{(t_i - \tau)^{1/2}} \cdot d\tau;$$

$$b_{1i} = R_1(t_i)$$

with $t_i \in (t_3, t_4)$—the auxiliary late time acquisition interval.

The ideal data line 78 represents the formation signal calculated for equivalent transmitter and receiver dipoles for a homogeneous conductive medium with resistivity 10 Ohm·m. This signal can be considered the true formation signal. It can be seen from the FIGS. 8-9 that without the calibration using downhole operation data, the residual drill collar signal due to its instability dominates the measured signal in the time interval $10^{-4}$-$10^{-3}$ s. The time interval of $10^{-4}$-$10^{-3}$ s typically corresponds to a depth of investigation of about 60-100 feet, which is the most important range for ultra-deep geosteering (including ahead of the bit) applications.

The apparatuses and methods described herein provide various advantages over prior art techniques. The apparatuses and methods allow for removing the effects of the drill collar without having to know the changes in the drill collar that occur during downhole operation. Such changes include environmental changes (temperature and pressure) as well as physical changes such as deformation and vibration.

Generally, some of the teachings herein are reduced to an algorithm that is stored on machine-readable media. The algorithm is implemented by a computer and provides operators with desired output.

The systems described herein may be incorporated in a computer coupled to the tool 24. Exemplary components include, without limitation, at least one processor, storage, memory, input devices, output devices and the like. As these components are known to those skilled in the art, these are not depicted in any detail herein. The computer may be disposed in at least one of a surface processing unit and a downhole component.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of processing electromagnetic signal data, the method comprising:

disposing a downhole tool in a borehole in an earth formation, the downhole tool including a conductive carrier, a transmitter, a first receiver disposed at a first axial distance from the transmitter, and a second receiver disposed at a second axial distance from the transmitter that is less than the first axial distance;

performing by a processor a downhole electromagnetic operation, the operation including transmitting an electromagnetic (EM) signal from the transmitter into the formation and detecting a first EM response signal by the first receiver and a second EM response signal by the second receiver;

applying by the processor a linear transformation to the second EM response signal to generate a transformed signal, the linear transformation having parameters associated with a set of data associated with a signal representing the conductive carrier; and subtracting by the processor the transformed signal from the first EM response signal to generate a corrected EM signal.

2. The method of claim 1, wherein the parameters are determined based on data acquired during the downhole operation.

3. The method of claim 1, wherein detecting is performed over a time period including a time period of interest from which formation properties are derived, and a subsequent time period, and the parameters are determined based on data acquired during the subsequent time period.

4. The method of claim 3, wherein the subsequent time period is a period during which received signals are known to be dominated by magnetic fields generated by the conductive carrier.

5. The method of claim 1, wherein applying the linear transformation includes convolution of the second signal with an impulse response.

6. The method of claim 5, wherein the impulse response includes parameters determined based on data acquired during the downhole operation.

7. The method of claim 6 wherein detecting is performed over a time period including a time period of interest from which formation properties are derived, and a subsequent time period during which received signals are known to be dominated by magnetic fields generated by the conductive carrier, and the parameters are determined based on the second EM response and sampling times of the second EM responses during the subsequent time period.

8. The method of claim 5, wherein the impulse response is approximated as:

$$h^*(t) = x_1 \delta(t) + x_2 \cdot \frac{1}{t^{1/2}},$$

wherein t is a time value, $x_1$ and $x_2$, are parameters of the function $h^*(t)$ and $\delta(t)$ is the Dirac delta-function.

9. The method of claim 8, wherein the parameters $x_1$ and $x_2$ are represented as a parameters vector $X=(x_1; x_2)$, and the parameters vector is determined from solving the following system of equations:

$$A \cdot X = B,$$

wherein A is a matrix norm of parameters $a_{1i}$ and $a_{2i}$, and A is represented by:

$$A = \begin{Vmatrix} a_{11} & a_{21} \\ a_{12} & a_{22} \\ \ldots & \ldots \\ a_{1i} & a_{2i} \end{Vmatrix},$$

wherein $$a_{1i} = R_2(t_i), \; a_{2i} = \int_0^{t_i} \frac{R(\tau)}{(t_i - \tau)^{1/2}} \cdot d\tau,$$

$t_i$ represents sampling times for the first and second EM response signals, $R_2(t_i)$ represents the second EM response signal as a function of sampling time, $R(\tau)$ represents a delayed signal as a function of a time delay $\tau$, B is a matrix norm of a parameter $b_i$, and B is represented by:

$$B = \begin{Vmatrix} b_1 \\ b_2 \\ \ldots \\ b_i \end{Vmatrix},$$

wherein $b_{1i} = R_1(t_i)$, $R_1(t_i)$ representing the first EM response signal as a function of sampling time.

10. The method of claim 1, wherein applying the linear transformation includes multiplying the second signal by a coefficient determined based on a ratio of axial distances of the first and second receiver relative to the transmitter.

11. An apparatus for processing electromagnetic signal data, the apparatus comprising:
a downhole tool configured to be disposed in a borehole in an earth formation, the downhole tool including a conductive carrier, a transmitter, a first receiver disposed at a first axial distance from the transmitter, and a second receiver disposed at a second axial distance from the transmitter that is less than the first axial distance; and
a processor configured to perform:
receiving a first electromagnetic (EM) response signal from the first receiver and a second EM response signal from the second receiver in response to an EM signal transmitted into the formation from the transmitter;
applying a linear transformation to the second EM response signal to generate a transformed signal, the linear transformation having parameters associated with a set of data associated with a signal representing the conductive carrier; and
subtracting the transformed signal from the first EM response signal to generate a corrected EM signal.

12. The apparatus of claim 11, wherein the parameters are determined based on data acquired during the downhole operation.

13. The apparatus of claim 11, wherein detecting is performed over a time period including a time period of interest from which formation properties are derived, and a subsequent time period, and the parameters are determined based on data acquired during the subsequent time period.

14. The apparatus of claim 13, wherein the subsequent time period is a period during which received signals are known to be dominated by magnetic fields generated by the conductive carrier.

15. The apparatus of claim 11, wherein applying the linear transformation includes convolution of the second signal with an impulse response function.

16. The apparatus of claim 15, wherein the impulse response includes parameters determined based on data acquired during the downhole operation.

17. The apparatus of claim 16, wherein detecting is performed over a time period including a time period of interest from which formation properties are derived, and a subsequent time period during which received signals are known to be dominated by magnetic fields generated by the conductive carrier, and the parameters are determined based on the second EM response and sampling times of the second EM responses during the subsequent time period.

18. The apparatus of claim 15, wherein the impulse response is approximated as:

$$h^*(t) = x_1 \delta(t) + x_2 \cdot \frac{1}{t^{1/2}},$$

wherein t value, $x_1$ and $x_2$, are parameters of the function h*(t) and $\delta(t)$ is the Dirac delta-function.

19. The apparatus of claim 18, wherein the parameters $x_1$ and $x_2$ are represented as a parameters vector $X=(x_1; x_2)$, and the parameters vector is determined from solving the following system of equations:

$A \cdot X = B$, wherein A is a matrix norm of parameters $a_{1i}$ and $a_{2i}$, and A is represented by:

$$A = \begin{Vmatrix} a_{11} & a_{21} \\ a_{12} & a_{22} \\ \ldots & \ldots \\ a_{1i} & a_{2i} \end{Vmatrix},$$

wherein $$a_{1i} = R_2(t_i), \; a_{2i} = \int_0^{t_i} \frac{R(\tau)}{(t_i - \tau)^{1/2}} \cdot d\tau,$$

$t_i$ represents sampling times for the first and second EM response signals, $R_2(t_i)$ represents the second EM response signal as a function of sampling time, $R(\tau)$ represents a delayed signal as a function of a time delay $\tau$, B is a matrix norm of a parameter $b_i$, and B is represented by:

$$B = \begin{Vmatrix} b_1 \\ b_2 \\ \ldots \\ b_i \end{Vmatrix},$$

wherein $b_{1i} = R_1(t_i)$, $R_1(t_i)$ representing the first EM response signal as a function of sampling time.

20. The apparatus of claim 11, wherein applying the linear transformation includes multiplying the second signal by a coefficient determined based on a ratio of axial distances of the first and second receiver relative to the transmitter.

* * * * *